United States Patent
Islam

(10) Patent No.: US 10,447,624 B2
(45) Date of Patent: Oct. 15, 2019

(54) METHOD FOR STREAMLINING COMMUNICATIONS BETWEEN GROUPS OF PRIMARY AND SECONDARY USERS, WHEREIN COMMUNICATION CAPABILITIES BETWEEN PRIMARY AND SECONDARY USERS ARE BASED ON WHETHER THE USER IS A PRIMARY OR SECONDARY USER

(71) Applicant: Quazi Shamim Islam, Southfield, MI (US)

(72) Inventor: Quazi Shamim Islam, Southfield, MI (US)

(*) Notice: Subject to any disclaimer, the term of this patent is extended or adjusted under 35 U.S.C. 154(b) by 352 days.

(21) Appl. No.: 15/591,047

(22) Filed: May 9, 2017

(65) Prior Publication Data
US 2017/0324694 A1 Nov. 9, 2017

Related U.S. Application Data

(60) Provisional application No. 62/337,055, filed on May 16, 2016, provisional application No. 62/333,490, filed on May 9, 2016.

(51) Int. Cl.
*H04L 12/58* (2006.01)
*H04L 12/18* (2006.01)

(52) U.S. Cl.
CPC ........ *H04L 51/046* (2013.01); *H04L 12/1895* (2013.01)

(58) Field of Classification Search
CPC .................. H04L 51/046; H04L 12/1895
See application file for complete search history.

(56) References Cited

U.S. PATENT DOCUMENTS

| | | | | |
|---|---|---|---|---|
| 5,634,011 A * | 5/1997 | Auerbach | ........... | H04L 12/1854 370/390 |
| 5,758,291 A * | 5/1998 | Grube | .................. | H04W 84/08 455/518 |
| 6,175,842 B1 * | 1/2001 | Kirk | ...................... | G06Q 10/10 715/205 |
| 6,182,147 B1 * | 1/2001 | Farinacci | .............. | H04L 12/185 370/392 |
| 6,240,188 B1 * | 5/2001 | Dondeti | ................ | H04L 9/0891 380/259 |
| 6,493,722 B1 * | 12/2002 | Daleen | .................. | G06Q 30/02 |
| 7,409,428 B1 * | 8/2008 | Brabec | ................... | H04L 29/06 709/205 |

(Continued)

*Primary Examiner* — Daniel C. Murray

(57) ABSTRACT

A method for method for streamlining communications between groups of users uses multiple user accounts and a remote server. Each user account is associated to a user PC device. Additionally, the method associates each user with a representative group. The user account is identified as a primary account or a secondary account. As a result, primary accounts are granted greater messaging permissions than secondary accounts. To that end, the secondary accounts are able to broadcast messages to all of the primary accounts that are associated to a representative group. The primary accounts on the other hand are able to selectively send messages to one or more individual secondary accounts. Moreover, the primary accounts are able to broadcast messages to the primary accounts that are associated to any of the representative groups.

16 Claims, 17 Drawing Sheets

(56) References Cited

U.S. PATENT DOCUMENTS

| | | | | |
|---|---|---|---|---|
| 7,512,788 B2* | 3/2009 | Choi | | H04L 63/0421 |
| | | | | 713/163 |
| 7,747,850 B1* | 6/2010 | Gordon | | H04L 63/0823 |
| | | | | 713/155 |
| 9,477,374 B1* | 10/2016 | Snabl | | H04L 51/10 |
| 10,085,141 B1* | 9/2018 | Huang | | H04W 4/90 |
| 10,129,041 B2* | 11/2018 | Holden | | H04L 12/1895 |
| 2002/0138522 A1* | 9/2002 | Muralidhar | | H04L 51/066 |
| | | | | 715/273 |
| 2003/0088824 A1* | 5/2003 | Ayan | | G06Q 30/02 |
| | | | | 715/201 |
| 2003/0197615 A1* | 10/2003 | Roche | | G08B 21/22 |
| | | | | 340/573.1 |
| 2003/0220946 A1* | 11/2003 | Malik | | H04L 63/104 |
| 2004/0111612 A1* | 6/2004 | Choi | | H04L 63/0421 |
| | | | | 713/163 |
| 2005/0246186 A1* | 11/2005 | Nikolov | | G06Q 10/107 |
| | | | | 709/206 |
| 2006/0105793 A1* | 5/2006 | Gutowski | | H04W 4/02 |
| | | | | 455/518 |
| 2007/0162588 A1* | 7/2007 | Wu | | H04W 4/08 |
| | | | | 709/223 |
| 2007/0232292 A1* | 10/2007 | Larocca | | H04L 12/185 |
| | | | | 455/425 |
| 2008/0034114 A1* | 2/2008 | Ducey | | H04H 20/24 |
| | | | | 709/238 |
| 2009/0077045 A1* | 3/2009 | Kirchmeier | | G06Q 10/06 |
| 2009/0133056 A1* | 5/2009 | Yun | | H04H 20/59 |
| | | | | 725/33 |
| 2009/0177977 A1* | 7/2009 | Jones | | G06N 3/006 |
| | | | | 715/753 |
| 2010/0234002 A1* | 9/2010 | Scheffer | | G06Q 30/02 |
| | | | | 455/414.3 |
| 2010/0299275 A1* | 11/2010 | Greenspan | | G06Q 10/107 |
| | | | | 705/319 |
| 2011/0053550 A1* | 3/2011 | Xing | | H04L 12/189 |
| | | | | 455/404.1 |
| 2012/0036209 A1* | 2/2012 | Lewis | | G06Q 10/10 |
| | | | | 709/206 |
| 2012/0095977 A1* | 4/2012 | Levin | | G06F 16/9535 |
| | | | | 707/706 |
| 2012/0095978 A1* | 4/2012 | Levin | | G06F 16/9535 |
| | | | | 707/706 |
| 2012/0202185 A1* | 8/2012 | Jabara | | G09B 5/00 |
| | | | | 434/350 |
| 2013/0110565 A1* | 5/2013 | Means, Jr. | | G06Q 10/06 |
| | | | | 705/7.11 |
| 2013/0124651 A1* | 5/2013 | Ding | | H04L 29/08072 |
| | | | | 709/206 |
| 2013/0218973 A1* | 8/2013 | Good | | H04L 67/306 |
| | | | | 709/204 |
| 2013/0226708 A1* | 8/2013 | Good | | G06Q 10/00 |
| | | | | 705/14.66 |
| 2013/0227384 A1* | 8/2013 | Good | | H04L 67/10 |
| | | | | 715/205 |
| 2013/0298006 A1* | 11/2013 | Good | | G06Q 10/107 |
| | | | | 715/234 |
| 2014/0280603 A1* | 9/2014 | Rideout | | H04L 51/046 |
| | | | | 709/205 |
| 2014/0317116 A1* | 10/2014 | Shah | | G06Q 10/101 |
| | | | | 707/737 |
| 2014/0364081 A1* | 12/2014 | Rauner | | H04L 12/1895 |
| | | | | 455/404.2 |
| 2015/0193742 A1* | 7/2015 | Los | | G06Q 10/1093 |
| | | | | 705/7.19 |
| 2016/0065508 A1* | 3/2016 | Ferreira | | H04L 51/14 |
| | | | | 709/206 |
| 2017/0041254 A1* | 2/2017 | Agara Venkatesha Rao | | |
| | | | | H04L 51/04 |
| 2018/0027068 A1* | 1/2018 | Kumar | | G06Q 50/01 |
| | | | | 709/206 |
| 2018/0061155 A1* | 3/2018 | Ghorpade | | G07C 9/00071 |
| 2018/0091451 A1* | 3/2018 | Gu | | H04L 51/046 |
| 2018/0314976 A1* | 11/2018 | Miao | | H04L 51/32 |
| 2018/0337795 A1* | 11/2018 | Katrak | | H04L 63/104 |
| 2019/0005592 A1* | 1/2019 | Schlesinger | | G06F 16/437 |
| 2019/0073213 A1* | 3/2019 | Dong | | G06F 8/65 |
| 2019/0158986 A1* | 5/2019 | Marque-Pucheu | | H04W 4/029 |
| 2019/0174288 A1* | 6/2019 | Bozik | | H04W 4/90 |

* cited by examiner

METHOD FOR STREAMLINING COMMUNICATIONS BETWEEN GROUPS OF PRIMARY AND SECONDARY USERS, WHEREIN COMMUNICATION CAPABILITIES BETWEEN PRIMARY AND SECONDARY USERS ARE BASED ON WHETHER THE USER IS A PRIMARY OR SECONDARY USER

The current application claims a priority to the U.S. Provisional Patent application Ser. No. 62/333,490 filed on May 9, 2016 and a priority to the U.S. Provisional Patent application Ser. No. 62/337,055 filed on May 16, 2016.

FIELD OF THE INVENTION

The present invention relates generally to a method of communicating messages between groups of individuals. More specifically, the present invention relates to a method of facilitating communication between individual users and the representatives of groups with which the individual users are associated.

BACKGROUND OF THE INVENTION

Current applications in the field of multi-user broadcast messaging provide one-way multiplexed (one-to-many) message transmission from a single centralized transmission origin point such as a school or fleet management office. Additionally, traditional applications offer a single hierarchy with one or more levels for safety notification. Some of the traditional applications are near-real-time while others are not. This causes a problem when users are misled into thinking they are interacting with a real-time message distribution service. Another shortcoming is that traditional applications follow a single one-way message dissemination hierarchy, with one or more levels for a given school or organization.

The present invention, the method for streamlining communication between groups of users, addresses these problems by providing a two-way multiplexed (one-to-many, one-to-one, threaded conversations) message transmission system. Additionally, the present invention enables messages to be generated from multiple decentralized transmission origins such as transportation companies, schools, and district offices. Furthermore, the present invention enables multiple many-to-many configuration possibilities for near-real-time notifications.

The present invention employs a network platform that provides a clear point-to-point communications channel. Any communications failure between users is immediately identified and notifications are immediately generated if the remote server is available. If the remote server is not available, the best possible notification delivery protocol is used instead. All notifications are based on user preference, but delivery, once recorded, is guaranteed.

Instead of trying to be a confidential communications channel, the present invention provides transparency as a safety feature. Nothing is hidden, beyond the user's password, so that the data can be reviewed at any time for public safety. Only account login information is encrypted. Passwords are not retained once authentication has taken place. The present invention is multi-level multi-hierarchical in that users can be subdivided into groups based on information such as location, occupation, organizational affiliation, and the like. The present invention enables communication between these hierarchical structures by allowing multiple levels of permissions to control of the audience of each message so that users only see messages relevant to them.

The present invention is primarily developed to empower the members of a school district who are concerned by the safety of the school district. The present invention enables these individuals to be in direct communication with each other in a timely, traceable and auditable fashion. Also, the present invention isolates the network from any extraneous intrusions, such as marketing and other unauthorized sources. The present invention provides the school district the final say in who is allowed to use the service in order to focus on education safety. In addition, the present invention provides the ability to send high severity messages. These messages can trigger 911 calls. This ensures that 911 is used when appropriate and this network is not used to replace the 911 system. Lastly, as a safety feature, no message is deleted once sent. Any messages that need to be archived for storage limitations, are given to the school as a public record to manage.

DETAIL DESCRIPTIONS OF THE INVENTION

All illustrations of the drawings are for the purpose of describing selected versions of the present invention and are not intended to limit the scope of the present invention.

As can be seen in FIG. 1 through FIG. 12, the preferred embodiment of the present invention is a method for streamlining communication between groups of users. The method of the present invention separates users into representative groups that are further stratified between primary users and secondary users. The primary users serve as moderators and group representatives who are able to address the questions and comments of the secondary users. That is, when a secondary user addresses a question to the representative group, any of the primary users who are associated to the group are given the opportunity to respond to the secondary user's question. The method of the present invention streamlines the process of responding to messages by enabling any one of the group of primary users to respond to a question that was addressed to the representative group. Additionally, the method of the present invention facilitates sending messages to a wide group of users by enabling a primary user to transmit a message to multiple secondary users and representative groups. Another functionality enabled by the method of the present invention is the ability to track what happens to a transmitted message. For example, if a secondary user transmits a message to a representative group, the secondary user will receive updates whenever the message is opened, deleted, forwarded or responded to. In this way, the method of the present invention keeps users abreast of the status of a message.

Figure 1:
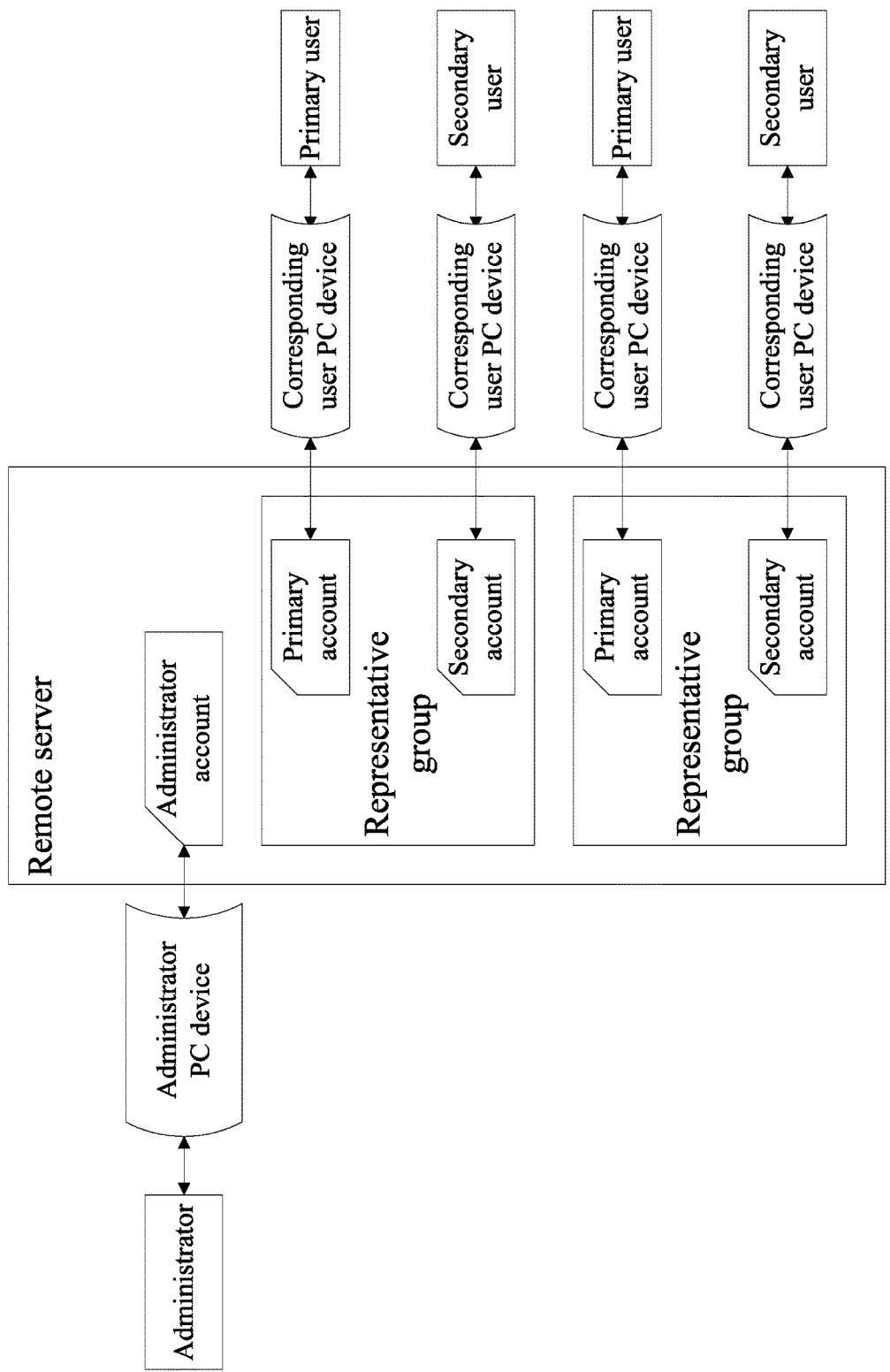
FIG. 1 is a block diagram illustrating the system overview of the present invention.

As can be seen in FIG. 1, the system used to execute the method of the present invention allows the present invention to function as a communication tool between multiple users. To accomplish this, the method of the present invention associates each of the plurality of users with a unique user account from a plurality of user accounts that is managed by a remote server (Step A). The plurality of user accounts is divided into a plurality of primary accounts and a plurality of secondary accounts. Each of the plurality of primary accounts is tied to a single primary user who is granted permissions that enable the primary user to perform functions including, but not limited to, responding to questions issued by secondary accounts and generating messages that are transmitted to multiple user accounts. Each of the plurality of secondary accounts is tied to a single secondary user who is only granted sufficient permissions to send messages to primary accounts that are associated to the secondary account. Each of the plurality of user accounts is associated with a corresponding user personal computing (PC) device. The corresponding user PC devices used to interact with the present invention can be, but is not limited to, a smart-phone, a laptop, a desktop, or a tablet PC. The remote server is used to facilitate communication between the plurality of user accounts. Moreover, the remote server is used to execute a number of internal processes for the present invention and is used to store message data. The system used to execute the method of the present invention provides a plurality of representative groups that are managed by the remote server (Step B). Each of the plurality of representative groups is a group formed by secondary users and primary users. To that end, each user account is associated with at least one corresponding group from the plurality of representative groups. Each primary user in a representative group functions as a group representative that is able to respond to questions that are addressed to the representative group. Each secondary user functions as an individual user who is only able to address questions to associated representative groups. For example, a group of fifth-grade teachers can be the group representatives for the representative group labeled "fifth-grade teachers". Continuing the example, a group of parents of fifth-grade students can be seen as the individual users of the representative group for fifth-grade teachers. Because the secondary users are associated to the group of fifth-grade teachers, each parent is able to send a message to the group of teachers that are group representatives for the group of fifth-grade teachers. Once a question is received by the group representatives, any of the group representatives are able to respond to the received question.

Figure 2:
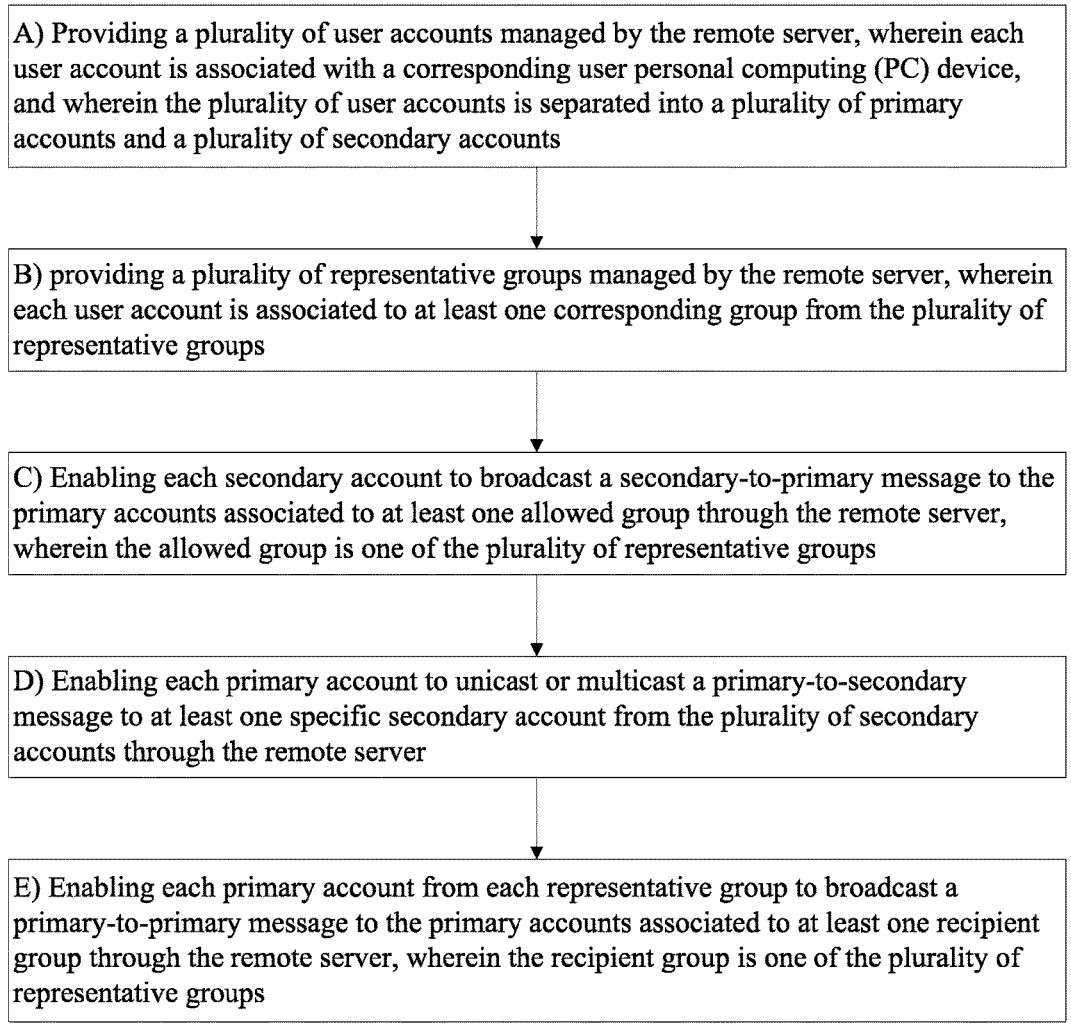
FIG. 2 is a flowchart describing the overall process followed by the method of the present invention.

As can be seen in FIG. 2, the overall method of the present invention accomplishes the above described functionalities by first enabling each secondary account to broadcast a secondary-to-primary message to the primary accounts associated to at least one allowed group through the remote server (Step C). The secondary-to-primary message is a message that secondary accounts are able to send to primary accounts. The at least one allowed group is a representative group to whom a secondary account is associated. Continuing with the example of fifth-grade teachers and parents from above, each parent is able to send messages to the group of fifth-grade teachers. However, a parent will not be able to send a message directly to a group of sixth grade teachers if the parent does not have a child that is in the sixth grade. The structure of the method of the present invention prevents the parent of a fifth-grade student from directly messaging a single fifth-grade teacher. As such, messages from the secondary users to the representative group are placed into a pool that each of the primary user associated to the representative group are able to answer.

As can be seen in FIG. 2, the overall method of the present invention continues by enabling each primary account to unicast or multicast a primary-to-secondary message to at least one specific secondary account from the plurality of secondary accounts through the remote server (Step D). The primary-to-secondary message is a message that primary accounts are able to send to any one of the secondary accounts. Continuing with the example of fifth-grade teachers and parents from above, a fifth-grade teacher is able to respond to a question that was delivered to the group of fifth-grade teachers by a parent. Additionally, the fifth-grade teacher is able to send a message directly to multiple parents. This communication workflow enables a single primary user to message a large group of secondary users, simultaneously.

As can be seen in FIG. 2, the overall method of the present invention continues by enabling each primary account from each representative group to broadcast a primary-to-primary message to the primary accounts associated to at least one recipient group through the remote server (Step E). The primary-to-primary message is a message that primary accounts are able to send to the group of primary accounts that are associated to other representative groups. The recipient group is any another group in the plurality of representative groups. Consequently, the primary account is able to send a message to any of the representative groups. Continuing with the example of fifth-grade teachers and parents from above, a fifth-grade teacher is able to send messages to the group of sixth grade teachers. However, the fifth-grade teacher will not be able to send a message directly to a single sixth grade teacher in the group of sixth grade teachers. This communication workflow enables multiple group representative to view a single message. Thus, preventing the message from becoming lost in a single user's inbox. In addition to generating messages, the method of the present invention enables the primary accounts to forward messages that are received from other primary accounts and secondary accounts.

Figure 3:
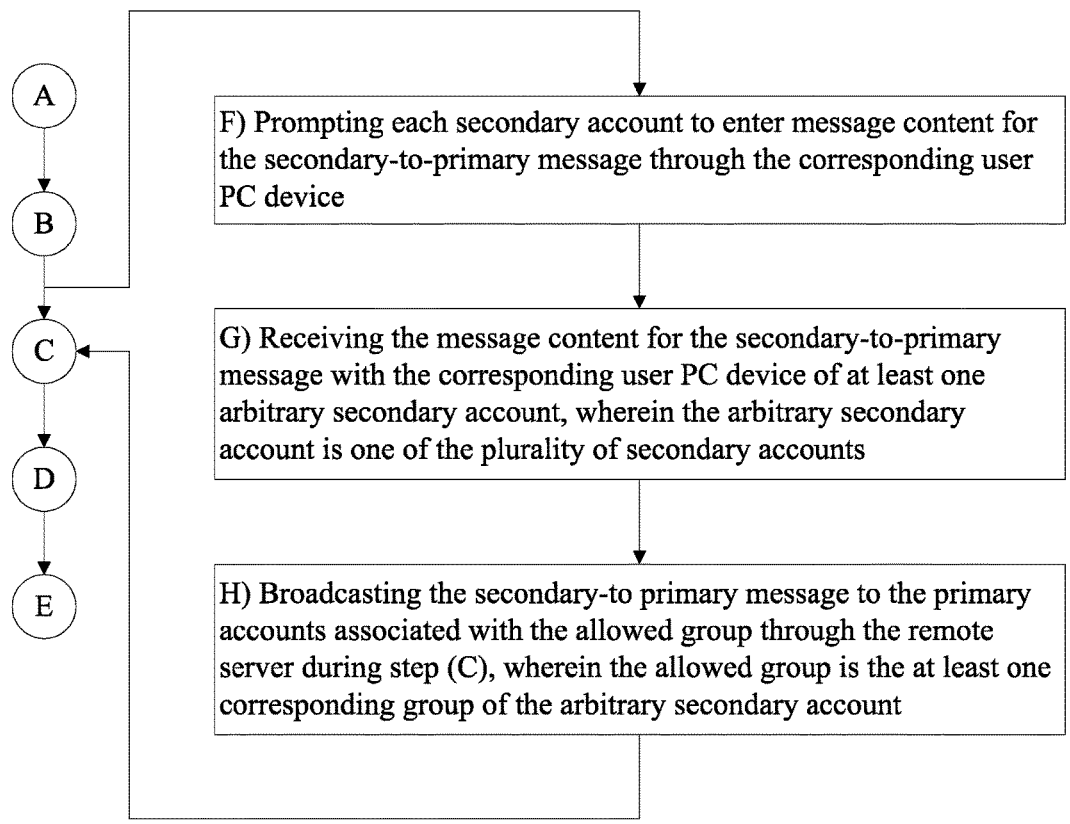
FIG. 3 is a flowchart describing a sub-process for enabling secondary users to send a secondary-to-primary message through the method of the present invention.

As can be seen in FIG. 3, a sub-process of the method of the present invention enables each secondary account to specify the content of the secondary-to-primary message that will be sent to the primary accounts in a representative group. To that end, the sub-process begins by prompting each secondary account to enter message content for the secondary-to-primary message through the corresponding user PC device (Step F). Each secondary account is given the option to generate a message that can be sent to a representative group to whom the secondary user is associated. The message content is the information that a secondary user would like to send to the primary users who are members of the representative group. Moreover, the message content can be various forms of information including, but not limited to, pictures, videos, audio files, and text. The sub-process continues by receiving the message content for the secondary-to-primary message with the corresponding user PC device of at least one arbitrary secondary account (Step G). The at least one arbitrary secondary account is any one of the plurality of secondary accounts that elects to send a secondary-to-primary message. Once the secondary user has entered the message content, the message content is integrated into the secondary-to-primary message. The sub-process continues by broadcasting the secondary-to primary message to the primary accounts associated with the allowed group through the remote server during Step C (Step H). The allowed group is the at least one corresponding group of the arbitrary secondary account. Returning again to the example of fifth-grade teachers and parents, the parent who only has a student in the fifth grade will only be able to send secondary-to-primary messages to the group of fifth-grade teachers. Thus, the allowed group for this parent is the representative group labeled "fifth-grade teachers". In a first alternative embodiment of the present invention, the secondary user is able to include a message deadline in the message content of the secondary-to-primary message. The message deadline indicates how long the plurality of primary accounts have to respond to the secondary-to-primary message. The secondary-to-primary message is displayed to the at least one primary account that is associated to a representative group with the message deadline. This indicates how much longer the at least one primary account has to respond to the secondary-to-primary message.

Figure 4:
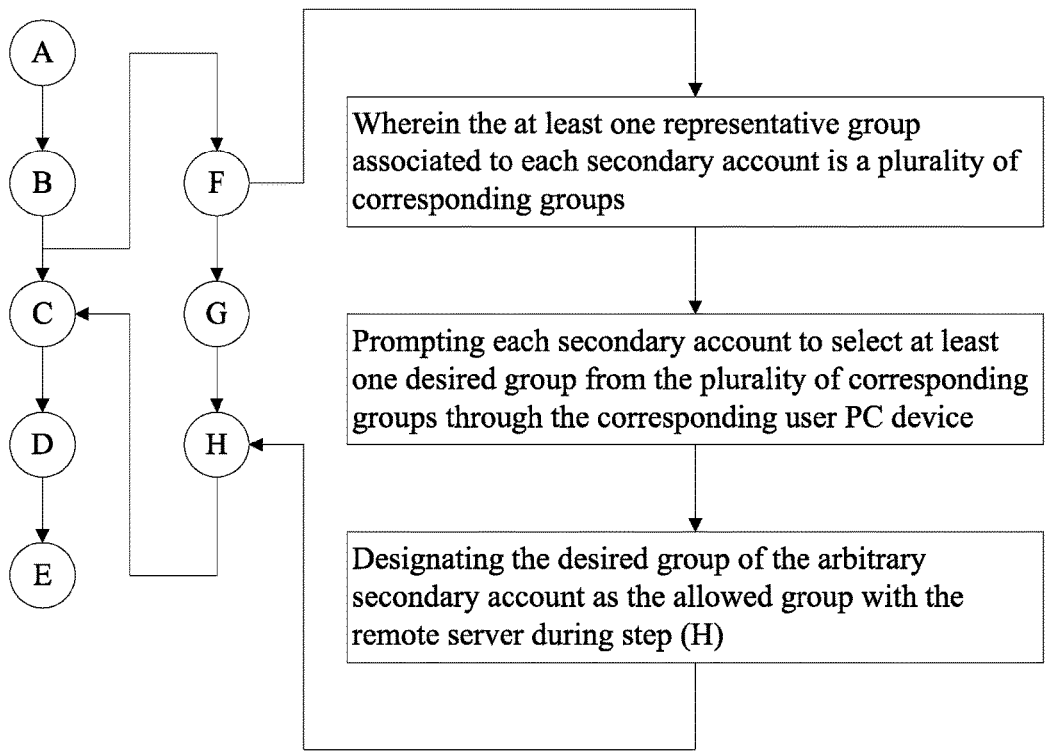
FIG. 4 is a flowchart describing a sub-process for enabling secondary users to select the representative group that will receive a secondary-to-primary message through the method of the present invention.

As can be seen in FIG. 4, a dependent sub-process to the secondary-to-primary message creation sub-process enables secondary accounts to select the allowed groups that will receive a secondary-to-primary message. In this secondary sub-process, the at least one representative group associated to each secondary account is a plurality of corresponding groups. That is, this secondary sub-process only applies to secondary accounts that are associated to multiple representative groups. This sub-process begins by prompting each secondary account to select at least one desired group from the plurality of corresponding groups through the corresponding user PC device. The secondary accounts who are associated to more than one representative group are given the option to select the representative group that will be the recipient of the secondary-to-primary message. For example, if a parent has children in both the fifth grade and the sixth grade, the parent is given the option to send a secondary-to-primary message to the fifth-grade representative group, the sixth-grade representative group, or both representative groups. The secondary sub-process continues by designating the desired group of the arbitrary secondary account as the allowed group with the remote server during Step H. Consequently, the secondary user's selection is taken to be the at least one desired recipient of the secondary-to-primary message.

Figure 5:
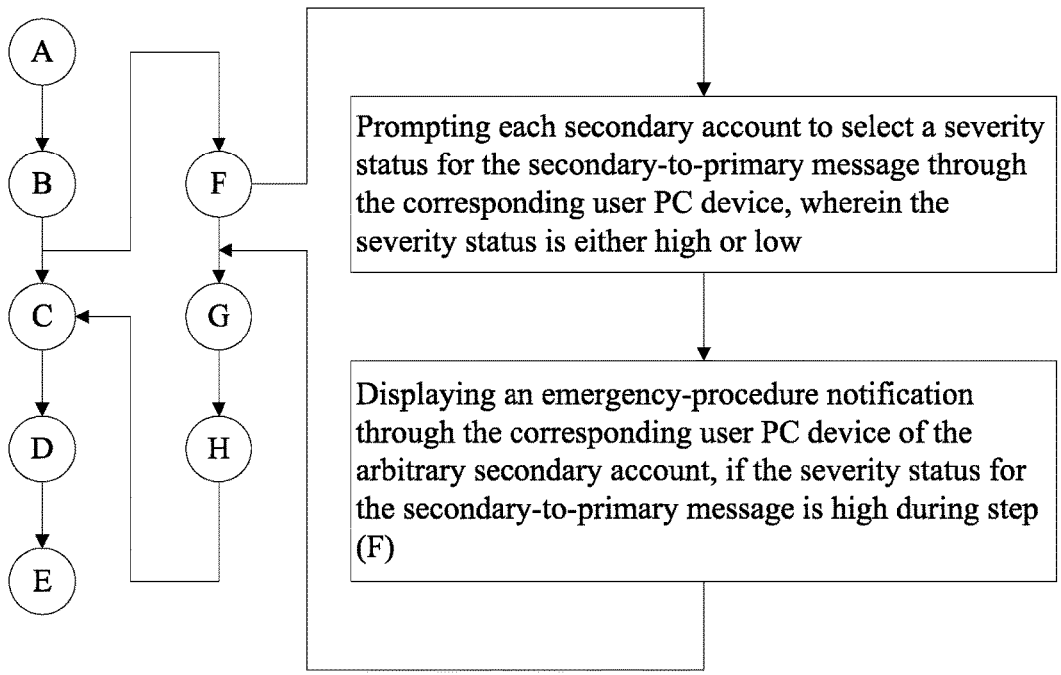
FIG. 5 is a flowchart describing a sub-process for instructing secondary users how to appropriately react when sending a high severity secondary-to-primary message through the method of the present invention.

As can be seen in FIG. 5, a separate sub-process of the method of the present invention is designed to give instructions to a secondary account that is attempting to use the present invention during an emergency. This sub-process begins by prompting each secondary account to select a severity status for the secondary-to-primary message through the corresponding user PC device. The severity status is an indicator that is used to flag a secondary-to-primary message as either high severity or low severity. The sub-process continues by displaying an emergency-procedure notification through the corresponding user PC device of the arbitrary secondary account, if the severity status for the secondary-to-primary message is high during Step F. This emergency-procedure notification instructs the secondary user to contact emergency response services in the event of an emergency. In the first alternative embodiment, the method of the present invention is equipped with a sub-process that automatically contacts emergency response services when a secondary-to-primary message has a high severity status.

Figure 6:
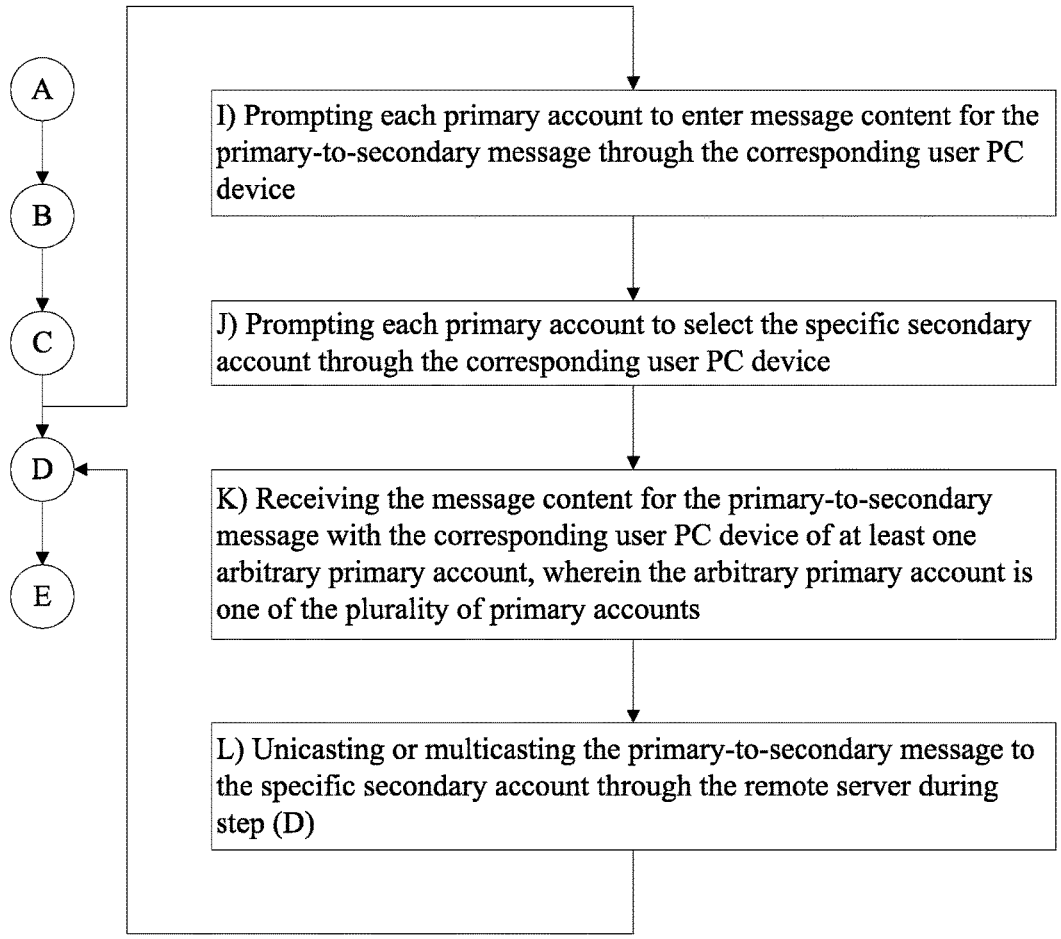
FIG. 6 is a flowchart describing a sub-process for enabling primary users to send a primary-to-secondary message through the method of the present invention.

As can be seen in FIG. 6, a sub-process of the method of the present invention enables each primary account to specify the content of the primary-to-secondary message that will be sent to at least one secondary account. To that end, the sub-process begins by prompting each primary account to enter message content for the primary-to-secondary message through the corresponding user PC device (Step I). Each primary account is given the option to generate a message that can be sent to at least one secondary account. The message content is the information that a primary user would like to send to at least one secondary user. Moreover, the message content can be various forms of information including, but not limited to, pictures, videos, audio files, and text. The sub-process continues by prompting each primary account to select the specific secondary account through the corresponding user PC device (Step J). The primary user is able to select the secondary users who will be recipients of the primary-to-secondary message. The sub-process continues by receiving the message content for the primary-to-secondary message with the corresponding user PC device of at least one arbitrary primary account (Step K). The at least one arbitrary primary account is any one of the plurality of primary accounts that elects to send a primary-to-secondary message. The message content is then integrated into the primary-to-secondary message. The sub-process continues by unicasting or multicasting the primary-to-secondary message to the at least one specific secondary accounts through the remote server during Step D (Step L). Returning again to the example of fifth-grade teachers and parents, a fifth-grade teacher will be able to send a primary-to-secondary message to any parent with a secondary account.

Figure 7:
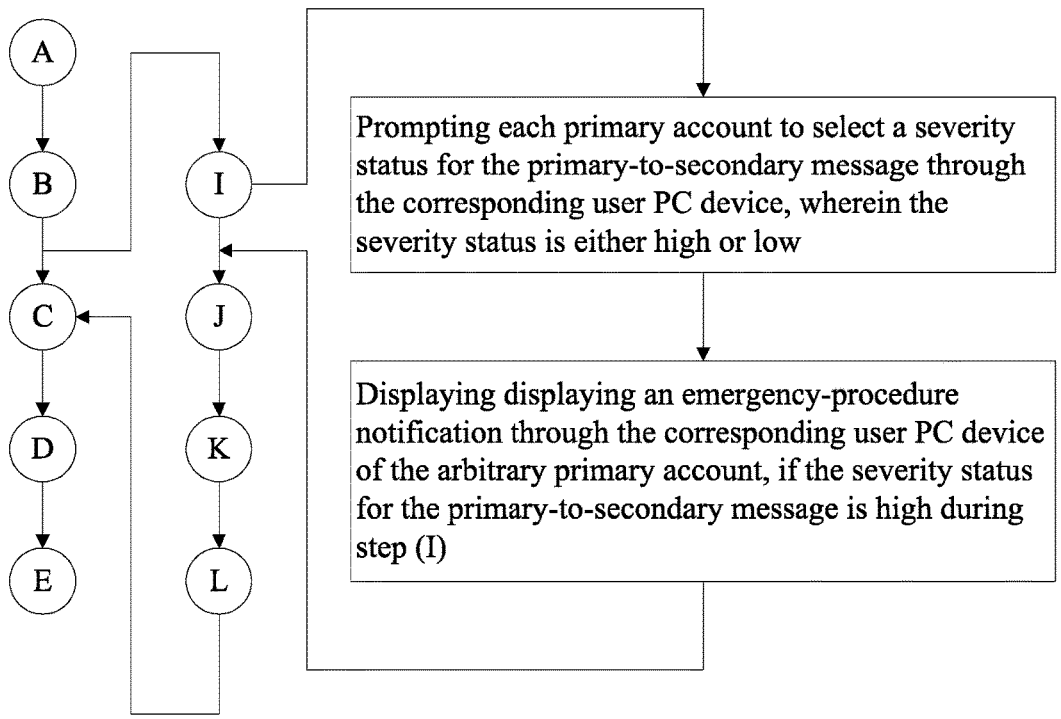
FIG. 7 is a flowchart describing a sub-process for instructing primary users how to appropriately react when sending a high severity primary-to-secondary message through the method of the present invention.

As can be seen in FIG. 7, a dependent sub-process of the method of the present invention is designed to give instructions to a primary account that is attempting to use the present invention during an emergency. This sub-process begins by prompting each primary account to select a severity status for the primary-to-secondary message through the corresponding user PC device. The severity status is an indicator that is used to flag a primary-to-secondary message as either high severity or low severity. The sub-process continues by displaying an emergency-procedure notification through the corresponding user PC device of the arbitrary primary account, if the severity status for the primary-to-secondary message is high during Step I. This emergency-procedure notification instructs the primary user to contact emergency response services in the event of an emergency. In the first alternative embodiment, the method of the present invention is equipped with a sub-process that automatically contacts emergency response services when a primary-to-secondary message has a high severity status.

Figure 8:
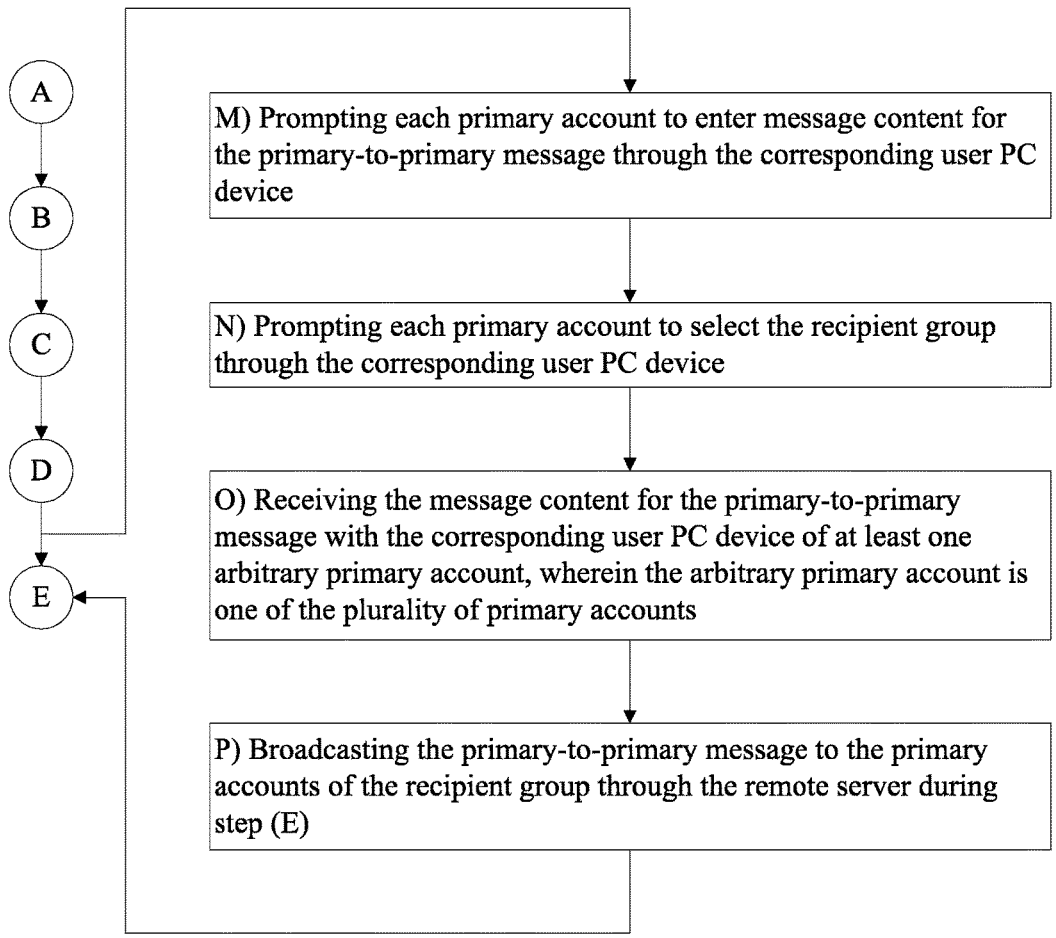
FIG. 8 is a flowchart describing a sub-process for enabling primary users to send a primary-to-primary message through the method of the present invention.

As can be seen in FIG. 8, a sub-process of the method of the present invention enables each primary account to specify the content of the primary-to-primary message that will be sent to at least one recipient group. To that end, the sub-process begins by prompting each primary account to enter message content for the primary-to-primary message through the corresponding user PC device (Step M). Each primary account is given the option to generate a message that can be sent to at least one recipient group. The message content is the information that a primary user from one representative group would like to send to the primary accounts associated with the recipient group. Moreover, the message content can be various forms of information including, but not limited to, pictures, videos, audio files, and text. The sub-process continues by prompting each primary account to select the recipient group through the corresponding user PC device (Step N). Consequently, the primary user is able to select the recipient group that will receive the primary-to-primary message. The sub-process continues by receiving the message content for the primary-to-primary message with the corresponding user PC device of at least one arbitrary primary account (Step O). The at least one arbitrary primary account is any one of the plurality of primary accounts that elects to send a primary-to-primary message. Once the primary user has entered the message content, the message content is integrated into the primary-to-primary message. The sub-process continues by broadcasting the primary-to-primary message to the primary accounts of the recipient group through the remote server during Step E (Step P). Returning again to the example of fifth-grade teachers and parents, a fifth-grade teacher will be able to send a primary-to-primary message to any representative group. In the first alternative embodiment of the present invention, the primary user is able to include a message deadline in the message content of the primary-to-primary message. The message deadline indicates how long the plurality of primary accounts have to respond to the primary-to-primary message. The primary-to-primary message is displayed to the at least one primary account that is associated to a representative group with the message deadline. This indicates how much longer the at least one primary account has to respond to the primary-to-primary message.

Figure 9:
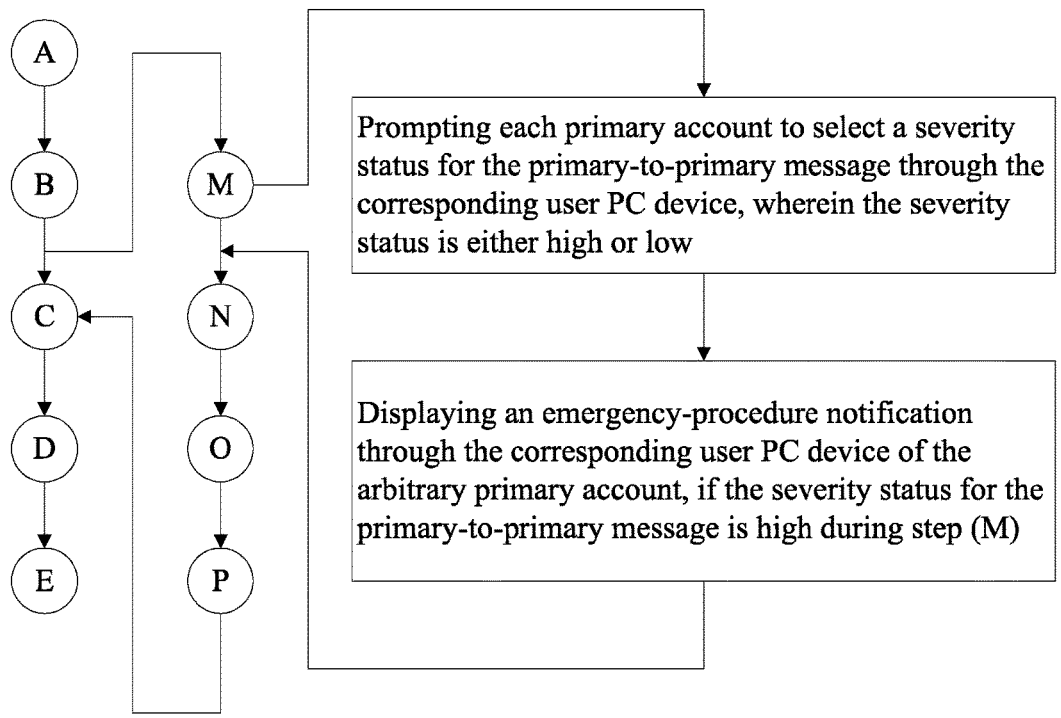
FIG. 9 is a flowchart describing a sub-process for instructing primary users how to appropriately react when sending a high severity primary-to-primary message through the method of the present invention.

As can be seen in FIG. 9, a dependent sub-process of the method of the present invention is designed to give instructions to a primary account that is attempting to use the present invention during an emergency. This sub-process begins by prompting each primary account to select a severity status for the primary-to-primary message through the corresponding user PC device. The severity status is an indicator that is used to flag a primary-to-primary message as either high severity or low severity. The sub-process continues by displaying an emergency-procedure notification through the corresponding user PC device of the arbitrary primary account, if the severity status for the primary-to-primary message is high during Step M. The emergency-procedure notification instructs the primary user to contact emergency response services in the event of an emergency. In the first alternative embodiment, the method of the present invention is equipped with a sub-process that automatically contacts emergency response services when a primary-to-primary message has a high severity status.

Figure 10:
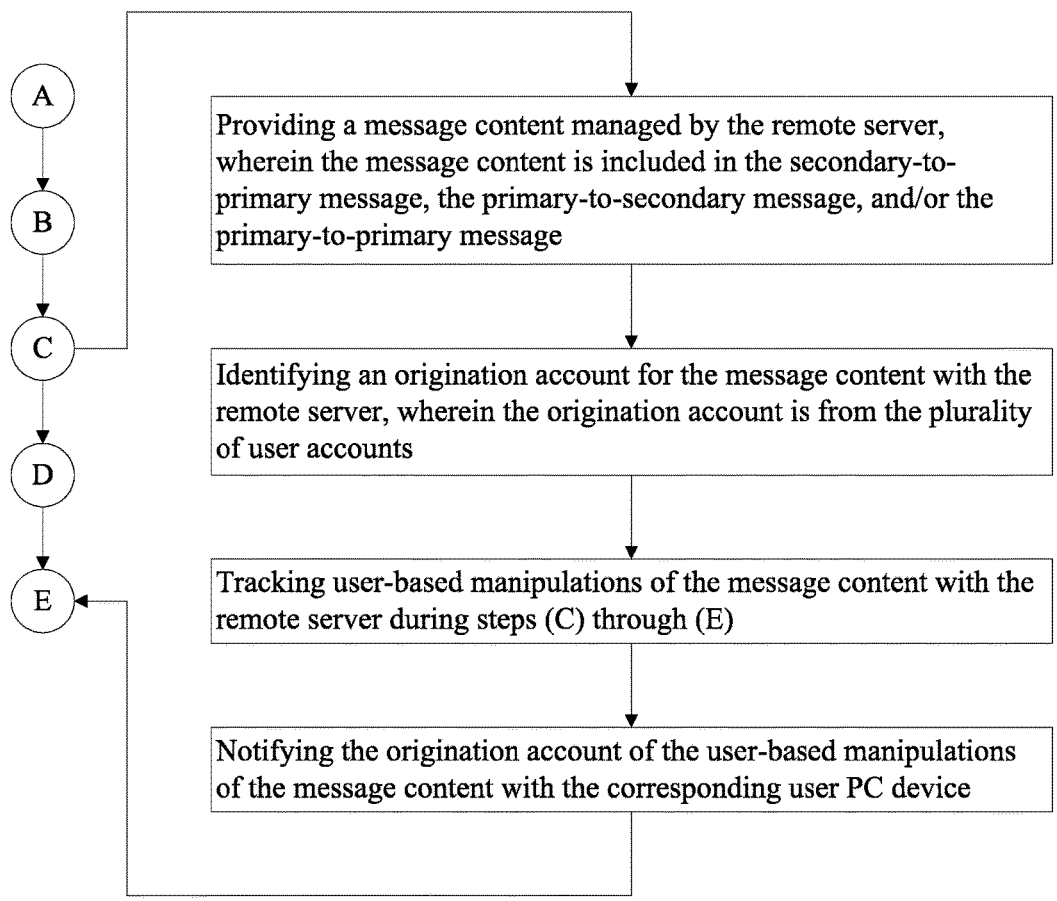
FIG. 10 is a flowchart describing a sub-process for tracking the user-based manipulations of a message through the method of the present invention.
Figure 11:
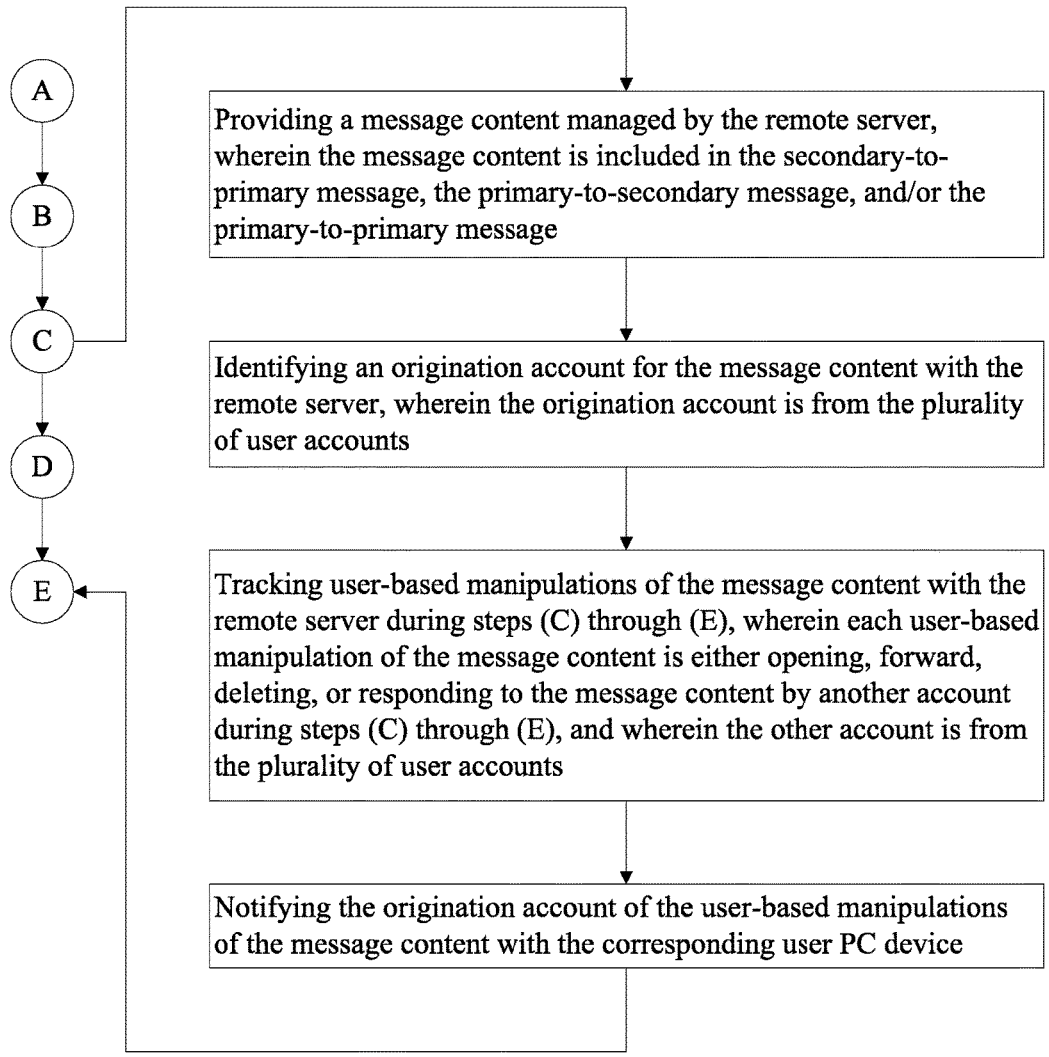
FIG. 11 is a flowchart describing a sub-process for tracking specific types of user-based manipulations of a message through the method of the present invention.

As can be seen in FIG. 10 and FIG. 11, a sub-process of the method of the present invention is designed to track a message as the message is manipulated by users. This sub-process is used to generate messages that notify the user who generated a message if the message has been opened, deleted, forwarded, or responded to. Additionally, the sub-process enables the user account to update the message deadline and to change a message status of the message content. To that end, the sub-process begins by providing a message content managed by the remote server. This sub-process is designed to monitor the message content that is included in secondary-to-primary messages, primary-to-secondary messages, and/or primary-to-primary messages. The sub-process continues by identifying an origination account for the message content with the remote server. The origination account can any one of the plurality of user accounts that has sent a message to another user account. This enables the method of the present invention to tie a message to a specific user so that all status updates can be correctly delivered to the specific user. The sub-process continues by tracking user-based manipulations of the message content with the remote server during Step C through Step E. The user-based manipulations are actions that any user account which receives the message content performs. These actions include, but are not limited to, opening the message content, forwarding the message content to another recipient group, deleting the message content, and responding to the message content. Furthermore, the user-based manipulation can be assigning a new message deadline which changes the duration within which the message content needs to be responded to. The sub-process monitors the message content to determine if any of these user-based manipulations have occurred. The sub-process continues by notifying the origination account of the user-based manipulations of the message content with the corresponding user PC device. This step occurs once the sub-process has determined that any of the user-based manipulations have been executed on the message content. The sub-process then sends a message to the origination account that describes what user-based manipulation has been executed and the user account that executed the user-based manipulation. Each user-based manipulation of the message content is either opening, forward, deleting, or responding to the message content by another account during Step C through Step E. Additionally, the other account is from the plurality of user accounts.

Figure 12:
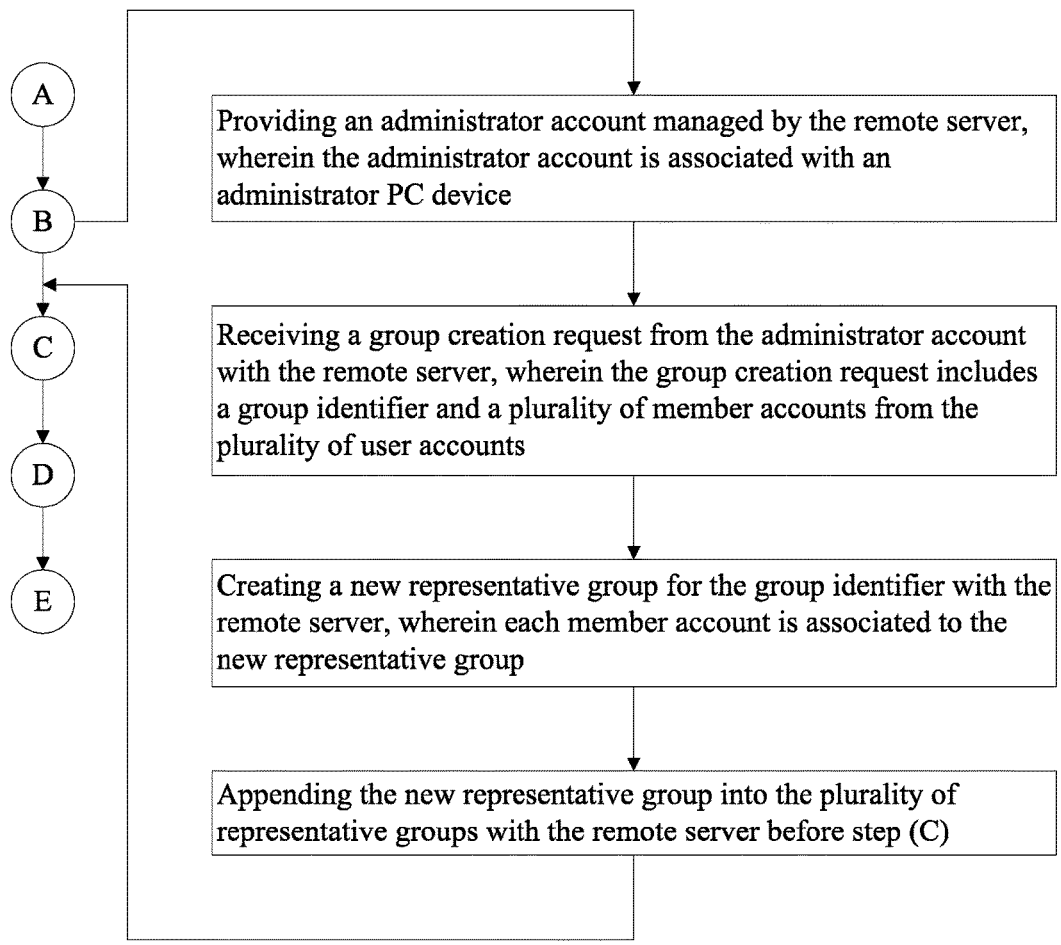
FIG. 12 is a flowchart describing a sub-process for tracking specific types of user-based manipulations of a message through the method of the present invention.

As can be seen in FIG. 12, a sub-process of the method of the present invention enables an administrator to create a representative group, and then add user accounts to the new representative group. To accomplish this, the sub-process begins by providing an administrator account managed by the remote server. The administrator account is linked to a specific individual who has the credentials to modify the group dynamics and user accounts of the present invention. Additionally, the administrator account is associated with an administrator PC device. The administrator PC devices used to interact with the present invention can be, but is not limited to, a smart-phone, a laptop, a desktop, or a tablet PC. The sub-process continues by receiving a group creation request from the administrator account with the remote server. The group creation request is a command that the administrator account issues to direct the present invention to generate a representative group and associate the representative group to a set of user accounts. To that end, the group creation request includes a group identifier and a plurality of member accounts from the plurality of user accounts. The group identifier is a piece of data that differentiates a representative group from the other representative groups in the plurality of representative groups. For example, the group identifier for the representative group of fifth-grade teachers would be the label "fifth-grade teachers". Each member account is a user account that the administrator account selects to be associated with the new representative group. The sub-process continues by creating a new representative group for the group identifier with the remote server. Each member account is associated to the new representative group. That is, the administrator determines the primary accounts and the secondary accounts that should be associated to the new representative group. The sub-process continues by appending the new representative group into the plurality of representative groups with the remote server before Step C. The new representative group is then added to the plurality of representative groups. For example, if the plurality of representative groups contains groups labeled "third-grade teachers", "fourth-grade teachers", and "sixth-grade teachers" then the administrator would create a new representative group labeled "fifth-grade teachers" and append the fifth-grade teachers group to the existing plurality of representative groups.

Figure 13:
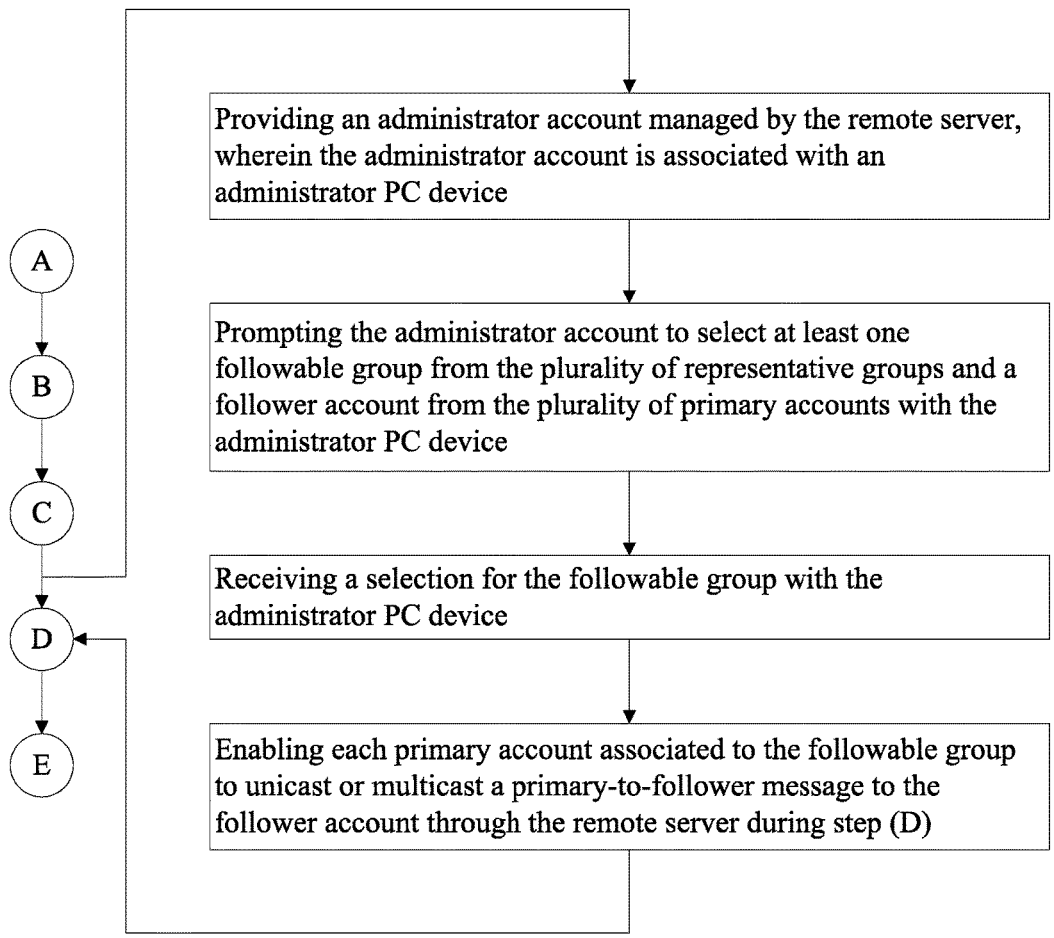
FIG. 13 is a flowchart describing a sub-process for enabling a primary account to receive direct messages from a representative group that the primary account follows through the method of the present invention.

As can be seen in FIG. 13, a sub-process of the method of the present invention gives primary users the ability to act as secondary users for multiple representative groups. That is, the method of the present invention enables a primary user to receive the messages that are sent to the secondary users who are associated to a specific representative group. To accomplish this, the sub-process begins by providing an administrator account managed by the remote server, wherein the administrator account is associated with an administrator PC device. The sub-process continues by prompting the administrator account to select at least one followable group from the plurality of representative groups and a follower account from the plurality of primary accounts with the administrator PC device. The followable group is a representative group that the primary user would like to virtually follow. For example, the primary user may be the parent of a fifth-grade child. As such, the primary user would like to receive direct messages from the primary accounts that are associated with the representative group of fifth-grade teachers. In this example, the representative group of fifth-grade teachers is the followable group and the parent is associated to the follower account Moreover, if the primary user desires to follow a representative group, the administrator then designates the primary user's primary account as a follower account for the followable group. The sub-process continues by receiving a selection for the followable group with the administrator PC device. The sub-process continues by enabling each primary account associated to the followable group to unicast or multicast a primary-to-follower message to the follower account through the remote server during Step D. The primary-to-follower message is a message that the primary accounts that are associated to a representative account are able to send to the primary users that are seen as followers of the representative group. Additionally, messages sent by the follower account to the primary accounts associated to the followable group indicate that the message was sent by a follower account. Conversely, any messages sent by the primary user that are not directed to the followable group indicate that the message was sent by a primary account.

Figure 14:
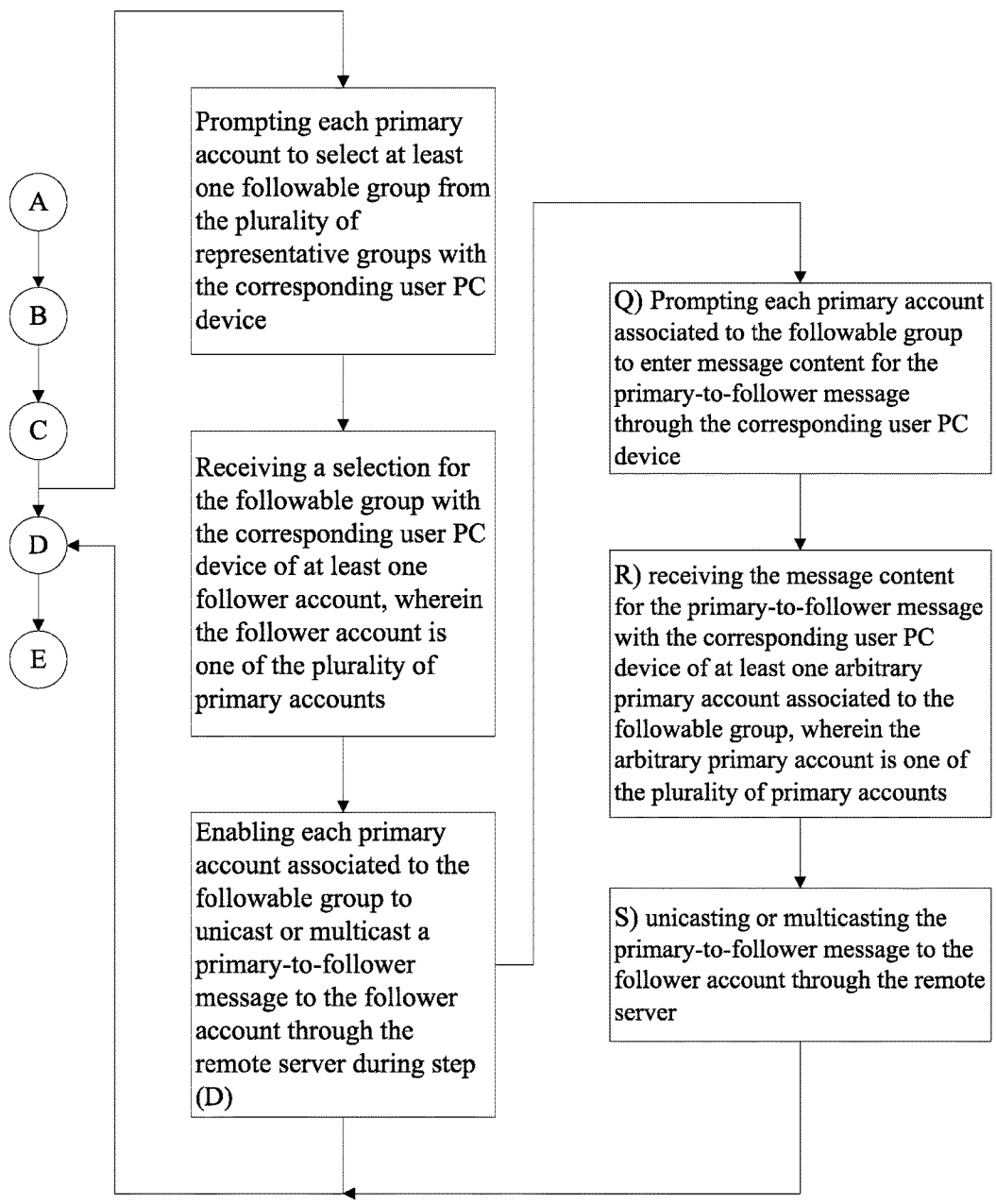
FIG. 14 is a flowchart describing a sub-process for enabling primary users to send a primary-to-follower message through the method of the present invention.

As can be seen in FIG. 14, a sub-process of the method of the present invention enables each primary account to specify the content of the primary-to-follower message that will be sent to at least one follower account. To that end, the sub-process begins by prompting each primary account associated to the followable group to enter message content for the primary-to-follower message through the corresponding user PC device (Step Q). Each primary account is given the option to generate a message that can be sent to the at least one follower account. The message content is the information that a primary user would like to send to the at least one follower account associated with the followable group. Moreover, the message content can be various forms of information including, but not limited to, pictures, videos, audio files, and text. The sub-process continues by receiving the message content for the primary-to-follower message with the corresponding user PC device of at least one arbitrary primary account associated to the followable group (Step R). The at least one arbitrary primary account is any one of the plurality of primary accounts that elects to send a primary-to-follower message. Once the primary user has entered the message content, the message content is integrated into the primary-to-follower message. The sub-process continues by unicasting or multicasting the primary-to-follower message to the follower account through the remote server (Step S). Returning again to the example of fifth-grade teachers and parents, a fifth-grade teacher will be able to send a primary-to-follower message to any primary user that is a parent of a child in the fifth grade.

Figure 15:
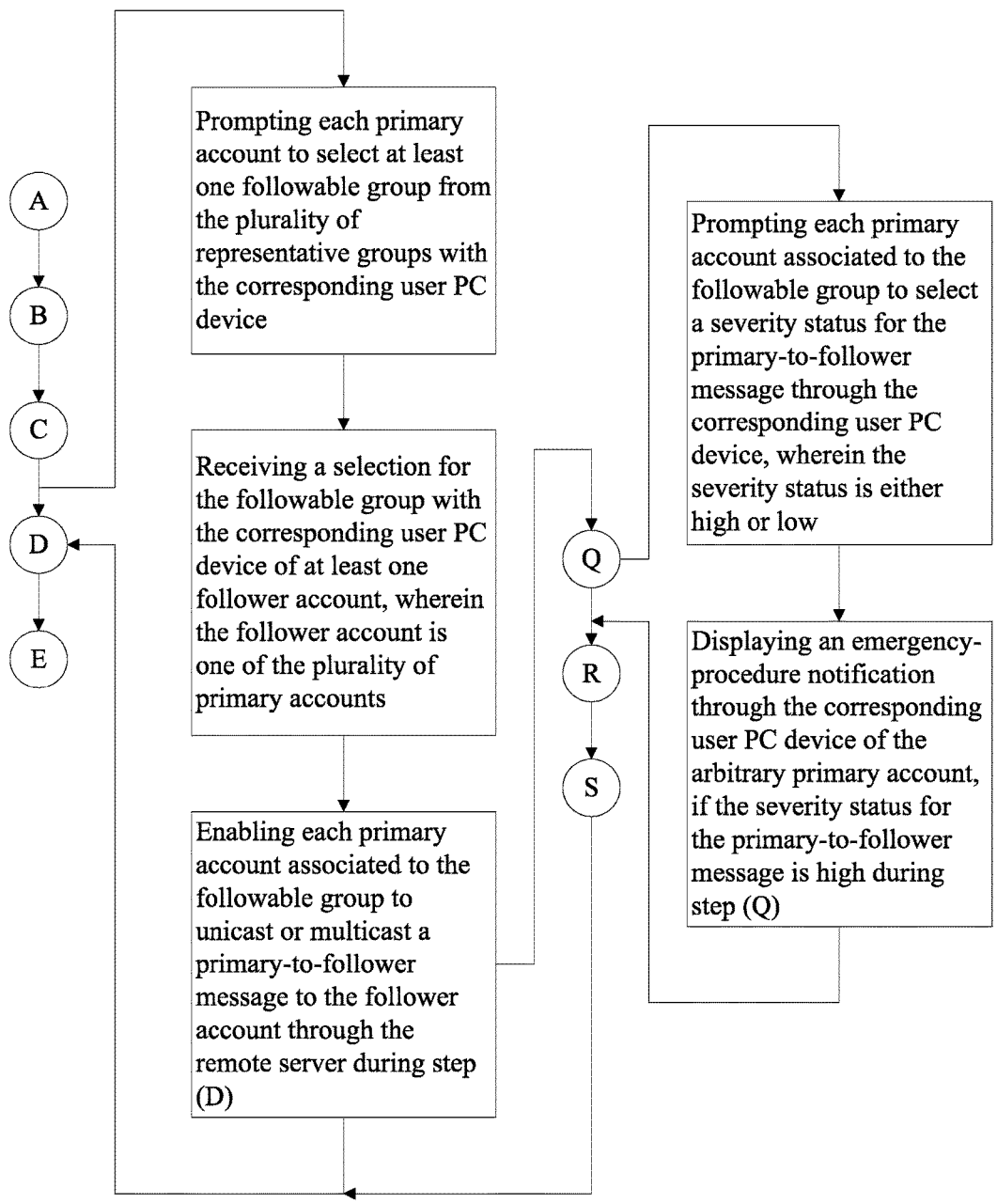
FIG. 15 is a flowchart describing a sub-process for instructing primary users how to appropriately react when sending a high severity primary-to-follower message through the method of the present invention.

As can be seen in FIG. 15, a dependent sub-process of the method of the present invention is designed to give instructions to a primary account that is attempting to use the present invention during an emergency. This sub-process begins by prompting each primary account to select a severity status for the primary-to-follower message through the corresponding user PC device. The severity status is an indicator that is used to flag a primary-to-follower message as either high severity or low severity. The sub-process continues by displaying an emergency-procedure notification through the corresponding user PC device of the arbitrary primary account, if the severity status for the primary-to-primary message is high during Step Q. The emergency-procedure notification instructs the primary user to contact emergency response services in the event of an emergency. In the first alternative embodiment, the method of the present invention is equipped with a sub-process that automatically contacts emergency response services when a primary-to-follower message has a high severity status.

Figure 16:
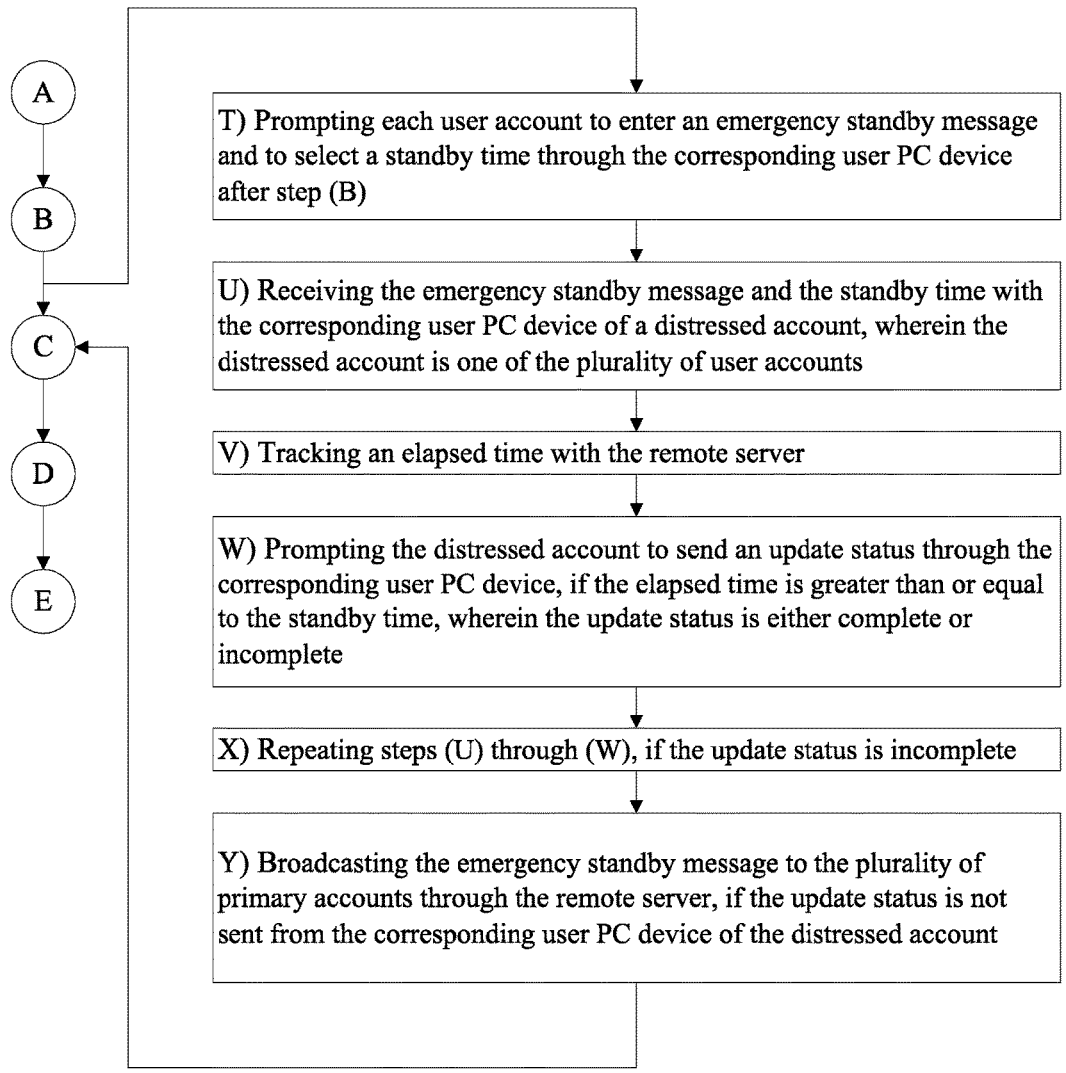
FIG. 16 is a flowchart describing a sub-process for sending an emergency standby message through the method of the present invention.
Figure 17:
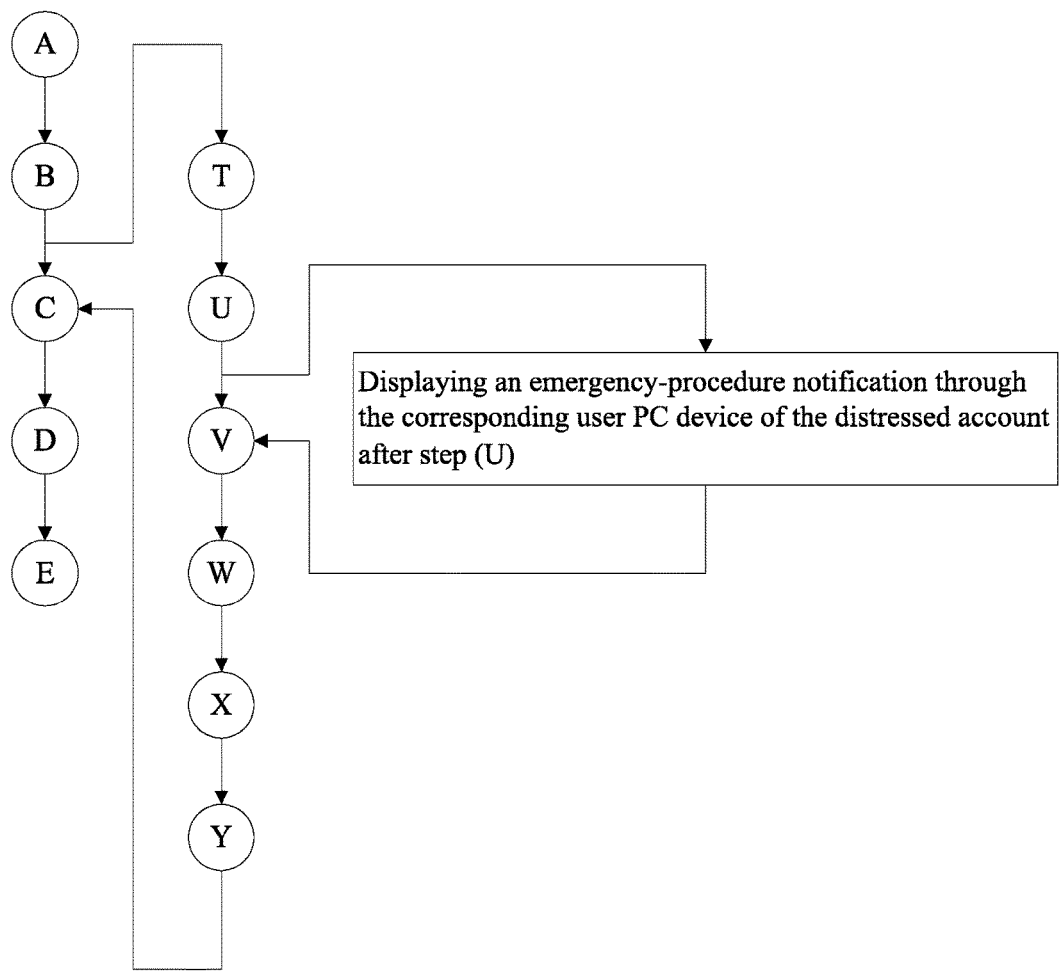
FIG. 17 is a flowchart describing a sub-process for instructing users how to appropriately react when sending an emergency standby message through the method of the present invention.

As can be seen in FIG. 16 and FIG. 17, a sub-process of the method of the present invention is designed to function as an emergency alert failsafe system. That is, the sub-process acts as a digital dead man's switch that enables each user of the present invention to send out a message if not deactivated. To accomplish this, the sub-process begins by prompting each user account to enter an emergency standby message and to select a standby time through the corresponding user PC device after Step B (Step T). The emergency standby message is a message that any user of the present invention is able to prepare before performing a dangerous task. The standby time is the period of time that the sub-process allows to elapse before asking the user for a status update. The sub-process continues by receiving an emergency standby message with the corresponding user PC device of a distressed account (Step U). The distressed account is any one of the user accounts that initiates the digital dead man's switch. The sub-process continues by tracking an elapsed time with the remote server (Step V). The elapsed time is the amount of time that has passed since the digital dead man's switch was initiated. The sub-process continues by prompting the distressed account to send an update status through the corresponding user PC device, if the elapsed time is greater than or equal to the standby time (Step W). This step monitors the amount of time since the digital dead man's switch was initiated and then checks in on the distressed user. Thus, determining if the distressed user is lucid enough to hold the digital dead man's switch. The sub-process gives the distressed user an option to restart the timer of the digital dead man's switch or to deactivate the digital dead man's switch by indicate if the update status is complete or incomplete. The sub-process continues by repeating Step U through Step W, if the update status is incomplete, which restarts the timer of the digital dead man's switch. If the update status if complete, the sub-process deactivates the digital dead man's switch. The sub-process continues by broadcasting the emergency standby message to the plurality of primary accounts through the remote server, if the update status is not sent from the corresponding user PC device of the distressed account. If the distressed user does not respond with a status update, the sub-process broadcasts the emergency standby message to the plurality of primary users. In addition, while the present invention can be used in an emergency situation, users will be better suited by contacting emergency response services in the event of an emergency. To that end, the sub-process continues by displaying an emergency-procedure notification through the corresponding user PC device of the distressed account after Step U.

Although the invention has been explained in relation to its preferred embodiment, it is to be understood that many other possible modifications and variations can be made without departing from the spirit and scope of the invention as hereinafter claimed.

What is claimed is:

1. A method for streamlining communications between groups of users, the method comprises the steps of:
    (A) providing a plurality of user accounts managed by the remote server, wherein each user account is associated with a corresponding user personal computing (PC) device, and wherein the plurality of user accounts is separated into a plurality of primary accounts and a plurality of secondary accounts;
    (B) providing a plurality of representative groups managed by the remote server, wherein each user account is associated to at least one corresponding group from the plurality of representative groups;
    (C) enabling each secondary account to broadcast a secondary-to-primary message to the primary accounts associated to at least one allowed group through the remote server, wherein the allowed group is one of the plurality of representative groups;
    (D) enabling each primary account to unicast or multicast a primary-to-secondary message to at least one specific secondary account from the plurality of secondary accounts through the remote server; and
    (E) enabling each primary account from each representative group to broadcast a primary-to-primary message to the primary accounts associated to at least one recipient group through the remote server, wherein the recipient group is one of the plurality of representative groups.

2. The method for streamlining communications between groups of users, the method as claimed in claim 1 comprises the steps of:
    (F) prompting each secondary account to enter message content for the secondary-to-primary message through the corresponding user PC device;
    (G) receiving the message content for the secondary-to-primary message with the corresponding user PC device of at least one arbitrary secondary account, wherein the arbitrary secondary account is one of the plurality of secondary accounts; and
    (H) broadcasting the secondary-to-primary message to the primary accounts associated with the allowed group through the remote server during step (C), wherein the allowed group is the at least one corresponding group of the arbitrary secondary account.

3. The method for streamlining communications between groups of users, the method as claimed in claim 2 comprises the steps of:
    wherein the at least one representative group associated to each secondary account is a plurality of corresponding groups;
    prompting each secondary account to select at least one desired group from the plurality of corresponding groups through the corresponding user PC device; and
    designating the desired group of the arbitrary secondary account as the allowed group with the remote server before step (H).

4. The method for streamlining communications between groups of users, the method as claimed in claim 2 comprises the steps of:
    prompting each secondary account to select a severity status for the secondary-to-primary message through the corresponding user PC device, wherein the severity status is either high or low; and
    displaying an emergency-procedure notification through the corresponding user PC device of the arbitrary secondary account, if the severity status for the secondary-to-primary message is high during step (F).

5. The method for streamlining communications between groups of users, the method as claimed in claim 1 comprises the steps of:
    (I) prompting each primary account to enter message content for the primary-to-secondary message through the corresponding user PC device;
    (J) prompting each primary account to select the specific secondary account through the corresponding user PC device;
    (K) receiving the message content for the primary-to-secondary message with the corresponding user PC device of at least one arbitrary primary account, wherein the arbitrary primary account is one of the plurality of primary accounts; and
    (L) unicasting or multicasting the primary-to-secondary message to the specific secondary account through the remote server during step (D).

6. The method for streamlining communications between groups of users, the method as claimed in claim 5 comprises the steps of:

prompting each primary account to select a severity status for the primary-to-secondary message through the corresponding user PC device, wherein the severity status is either high or low; and displaying an emergency-procedure notification through the corresponding user PC device of the arbitrary primary account, if the severity status for the primary-to-secondary message is high during step (I).

7. The method for streamlining communications between groups of users, the method as claimed in claim 1 comprises the steps of:

(M) prompting each primary account to enter message content for the primary-to-primary message through the corresponding user PC device;

(N) prompting each primary account to select the recipient group through the corresponding user PC device;

(O) receiving the message content for the primary-to-primary message with the corresponding user PC device of at least one arbitrary primary account, wherein the arbitrary primary account is one of the plurality of primary accounts; and (P) broadcasting the primary-to-primary message to the primary accounts of the recipient group through the remote server during step (E).

8. The method for streamlining communications between groups of users, the method as claimed in claim 7 comprises the steps of:

prompting each primary account to select a severity status for the primary-to-primary message through the corresponding user PC device, wherein the severity status is either high or low; and displaying an emergency-procedure notification through the corresponding user PC device of the arbitrary primary account, if the severity status for the primary-to-primary message is high during step (M).

9. The method for streamlining communications between groups of users, the method as claimed in claim 1 comprises the steps of:

providing a message content managed by the remote server, wherein the message content is included in the secondary-to-primary message, the primary-to-secondary message, and/or the primary-to-primary message;

identifying an origination account for the message content with the remote server, wherein the origination account is from the plurality of user accounts;

tracking user-based manipulations of the message content with the remote server during steps (C) through (E); and notifying the origination account of the user-based manipulations of the message content with the corresponding user PC device.

10. The method for streamlining communications between groups of users, the method as claimed in claim 9, wherein each user-based manipulation of the message content is either opening, forward, deleting, or responding to the message content by another account during steps (C) through (E), and wherein the other account is from the plurality of user accounts.

11. The method for streamlining communications between groups of users, the method as claimed in claim 1 comprises the steps of:

providing an administrator account managed by the remote server, wherein the administrator account is associated with an administrator PC device;

receiving a group creation request from the administrator account with the remote server, wherein the group creation request includes a group identifier and a plurality of member accounts from the plurality of user accounts;

creating a new representative group for the group identifier with the remote server, wherein each member account is associated to the new representative group; and appending the new representative group into the plurality of representative groups with the remote server before step (C).

12. The method for streamlining communications between groups of users, the method as claimed in claim 1 comprises the steps of:

providing an administrator account managed by the remote server, wherein the administrator account is associated with an administrator PC device;

prompting the administrator account to select at least one followable group from the plurality of representative groups and a follower account from the plurality of primary accounts with the administrator PC device;

receiving a selection for the followable group with the administrator PC device; and enabling each primary account associated to the followable group to unicast or multicast a primary-to-follower message to the follower account through the remote server during step (D).

13. The method for streamlining communications between groups of users, the method as claimed in claim 12 comprises the steps of:

(Q) prompting each primary account associated to the followable group to enter message content for the primary-to-follower message through the corresponding user PC device;

(R) receiving the message content for the primary-to-follower message with the corresponding user PC device of at least one arbitrary primary account associated to the followable group, wherein the arbitrary primary account is one of the plurality of primary accounts; and (S) unicasting or multicasting the primary-to-follower message to the follower account through the remote server.

14. The method for streamlining communications between groups of users, the method as claimed in claim 13 comprises the steps of:

prompting each primary account associated to the followable group to select a severity status for the primary-to-follower message through the corresponding user PC device, wherein the severity status is either high or low; and displaying an emergency-procedure notification through the corresponding user PC device of the arbitrary primary account, if the severity status for the primary-to-follower message is high during step (Q).

15. The method for streamlining communications between groups of users, the method as claimed in claim 1 comprises the steps of:

(T) prompting each user account to enter an emergency standby message and to select a standby time through the corresponding user PC device after step (B);

(U) receiving the emergency standby message and the standby time with the corresponding user PC device of a distressed account, wherein the distressed account is one of the plurality of user accounts;

(V) tracking an elapsed time with the remote server;

(W) prompting the distressed account to send an update status through the corresponding user PC device, if the elapsed time is greater than or equal to the standby time, wherein the update status is either complete or incomplete;

(X) repeating steps (U) through (W), if the update status is incomplete; and (Y) broadcasting the emergency standby message to the plurality of primary accounts through the remote server, if the update status is not sent from the corresponding user PC device of the distressed account.

16. The method for streamlining communications between groups of users, the method as claimed in claim 15 comprises the step of:

displaying an emergency-procedure notification through the corresponding user PC device of the distressed account after step (U).

* * * * *